US011253097B2

(12) United States Patent
Howitt

(10) Patent No.: US 11,253,097 B2
(45) Date of Patent: Feb. 22, 2022

(54) FOOD PREPARATION

(71) Applicant: Strix Limited, Isle of Man (GB)

(72) Inventor: James Robert Howitt, Colby (GB)

(73) Assignee: Strix Limited, Ronaldsway (IM)

( * ) Notice: Subject to any disclaimer, the term of this patent is extended or adjusted under 35 U.S.C. 154(b) by 657 days.

(21) Appl. No.: 15/743,176

(22) PCT Filed: Jul. 8, 2016

(86) PCT No.: PCT/GB2016/052057
§ 371 (c)(1),
(2) Date: Jan. 9, 2018

(87) PCT Pub. No.: WO2017/006127
PCT Pub. Date: Jan. 12, 2017

(65) Prior Publication Data
US 2019/0104879 A1    Apr. 11, 2019

(30) Foreign Application Priority Data

Jul. 9, 2015    (GB) .................................. 1512048.8

(51) Int. Cl.
*A47J 27/04*    (2006.01)
*A47J 27/10*    (2006.01)
(Continued)

(52) U.S. Cl.
CPC .............. *A47J 27/04* (2013.01); *A47J 27/10* (2013.01); *A47J 27/16* (2013.01); *A47J 36/2405* (2013.01); *A47J 2027/043* (2013.01)

(58) Field of Classification Search
CPC .. A47J 2027/043; A47J 27/10; A47J 36/2405; A47J 27/18; A47J 2027/008;
(Continued)

(56) References Cited

U.S. PATENT DOCUMENTS 3,332,338 A    7/1967 Wein
3,757,673 A    9/1973 Wallace
(Continued)

FOREIGN PATENT DOCUMENTS

CN    101049224 A  * 10/2007    ............ F16L 37/086
CN    201263606 Y  *  7/2009
(Continued)

OTHER PUBLICATIONS

WO 2012/049517 (Year: 2012).*
(Continued)

*Primary Examiner* — Erin E McGrath
*Assistant Examiner* — Tiffany T Tran
(74) *Attorney, Agent, or Firm* — Getz Balich LLC

(57) ABSTRACT

A food heating device includes a plurality of chambers capable of receiving respective food items. The device further includes a steam generator and a plurality of valves for controlling admittance of steam from said steam generator into said chambers. The device is arranged to operate in at least one mode in which during a first period a first one of said valves is open and at least one of said valves remains closed and wherein said steam generator is operated to produce steam for a time less than said first period.

10 Claims, 5 Drawing Sheets

(51) Int. Cl.
*A47J 27/16* (2006.01)
*A47J 36/24* (2006.01)

(58) Field of Classification Search
CPC ............ A47J 37/12; A47J 27/04–27/06; A47J 27/14–27/17
USPC ......... 99/330, 331, 338, 339, 352, 355, 357, 99/403, 407, 410, 468, 470, 475, 479, 99/483, 516, 520, 602
See application file for complete search history.

(56) References Cited

U.S. PATENT DOCUMENTS

| | | | |
|---|---|---|---|
| 3,774,251 | A | 11/1973 | Pellman |
| 3,934,497 | A | 1/1976 | Hannah |
| 4,189,504 | A | 2/1980 | Jimenez |
| 4,311,160 | A | 1/1982 | Charland |
| 4,335,649 | A | 6/1982 | Velasco, Jr. et al. |
| 4,782,953 | A | 11/1988 | McPhee |
| 5,123,337 | A | 6/1992 | Vilgrain et al. |
| 5,214,410 | A | 5/1993 | Verster |
| 5,280,748 | A | 1/1994 | Pardo |
| 5,321,232 | A | 6/1994 | Ogle |
| 5,542,344 | A | 8/1996 | Koether et al. |
| 5,552,172 | A | 9/1996 | Liebermann |
| 5,570,625 | A | 11/1996 | Liebermann |
| 5,724,244 | A | 3/1998 | Yabuki |
| 6,018,299 | A | 1/2000 | Eberhardt |
| 6,359,270 | B1 | 3/2002 | Bridson |
| 6,360,652 | B1 | 3/2002 | Cusenza et al. |
| 6,389,958 | B1 | 5/2002 | Ono |
| 6,484,514 | B1 | 11/2002 | Joseph et al. |
| 6,810,790 | B1 | 11/2004 | Sacca et al. |
| 6,892,545 | B2 | 5/2005 | Ishikawa et al. |
| 7,008,659 | B1 | 3/2006 | Ono |
| 7,060,953 | B2 | 6/2006 | Ishikawa et al. |
| 7,973,642 | B2 | 7/2011 | Schackmuth et al. |
| 9,226,609 | B2 | 1/2016 | Romero et al. |
| 9,404,649 | B2 | 8/2016 | Ashton et al. |
| 9,414,442 | B2 | 8/2016 | Torres et al. |
| 10,092,128 | B2 * | 10/2018 | Seitz ............... A47J 27/04 |
| 2003/0101875 | A1 | 6/2003 | Ono |
| 2005/0235838 | A1 | 10/2005 | Cohn |
| 2007/0164014 | A1 | 7/2007 | Saadoun |
| 2007/0235063 | A1 | 10/2007 | Hui |
| 2007/0253645 | A1 | 11/2007 | Sus et al. |
| 2008/0302253 | A1 | 12/2008 | Salvaro |
| 2009/0107477 | A1 | 4/2009 | Frock et al. |
| 2009/0252855 | A1 * | 10/2009 | Ewald ............... A23L 5/13 426/614 |
| 2010/0213187 | A1 | 8/2010 | Bandholz et al. |
| 2010/0320189 | A1 | 12/2010 | Buchheit |
| 2011/0139181 | A1 * | 6/2011 | Lee ............... F16L 37/086 134/18 |
| 2011/0217439 | A1 | 9/2011 | Morandotti et al. |
| 2012/0017769 | A1 | 1/2012 | Inoue et al. |
| 2012/0063753 | A1 | 3/2012 | Cochran et al. |
| 2012/0137898 | A1 | 6/2012 | Alipour |
| 2013/0255507 | A1 | 10/2013 | Meunier et al. |
| 2013/0264333 | A1 | 10/2013 | Alipour et al. |
| 2013/0279890 | A1 * | 10/2013 | Ashton ............... F22B 1/285 392/401 |
| 2014/0161946 | A1 | 6/2014 | Torricelli et al. |
| 2015/0265090 | A1 | 9/2015 | Pennella |
| 2017/0137204 | A1 | 5/2017 | Pennella |

FOREIGN PATENT DOCUMENTS

| | | |
|---|---|---|
| CN | 201263606 Y | 7/2009 |
| CN | 104921590 | 9/2015 |
| DE | 102007059883 | 6/2009 |
| EP | 0273323 | 6/1988 |
| EP | 0666046 | 8/1995 |
| EP | 1063620 | 12/2000 |
| EP | 1193584 | 4/2002 |
| EP | 1685781 | 2/2006 |
| EP | 2123981 | 11/2009 |
| EP | 2893853 | 10/2017 |
| GB | 530646 | 12/1940 |
| JP | 06231356 | 8/1984 |
| JP | H02158500 | 6/1990 |
| JP | 11276359 | 7/1991 |
| JP | 11120426 | 11/2000 |
| JP | 11230554 | 2/2001 |
| JP | 2001317741 | 11/2001 |
| JP | 2002051909 | 2/2002 |
| JP | 2008295410 | 12/2008 |
| KR | 20130085229 | 7/2013 |
| WO | WO2010103347 | 9/2010 |
| WO | 2010130567 | 11/2010 |
| WO | WO2011117659 | 3/2011 |
| WO | WO2009141995 | 9/2011 |
| WO | WO2006037252 | 11/2011 |
| WO | WO12116474 | 9/2012 |
| WO | WO13175118 | 11/2013 |
| WO | WO14077620 | 5/2014 |

OTHER PUBLICATIONS

English Translation of CN201263606Y (Year: 2008).*
WO2011/117669 (Year: 2011).*
Office action for CN201680040336.8 dated Jul. 2, 2019.

* cited by examiner

FOOD PREPARATION

This application is entitled to the benefit of, and incorporates by reference essential subject matter disclosed in PCT Application No. PCT/GB2016/052057 filed Jul. 8, 2016, which claims priority to GB Patent Application No. 1512048.8 filed Jul. 9, 2015.

BACKGROUND OF THE INVENTION

1. Technical Field

This invention relates to devices and methods for cooking food items, particularly devices and methods which use steam at least partially to cook the food.

2. Background Information

It has previously been proposed to use steam to cook, finish cooking or reheat food items. Steam has many advantages in such applications including the high degree of control which can be exercised.

In WO 2014/056814 for example there is a specific proposal for a 'sous-vide' food regeneration machine which uses a combination of hot water and steam to cook or finish cooking food which has been partially cooked and subsequently cooled. The machine has a number of chambers into which sealed packages containing partially cooked or raw food items may be placed. Each chamber has a valve controlling the flow of water into the chamber and an individual heater for heating the water that enters the respective chamber. The flow rate and rate of heating can be controlled so that either water heated to a specific temperature or steam is produced. This allows individual specific heating programs to be implemented in each chamber in accordance with pre-designed cooking regimes determined by the producers of the food packets.

However the Applicant has appreciated that there are a number of potential drawbacks with this arrangement. First the need to provide individual heaters for each chamber makes the machine expensive to produce. Second, in order to produce steam it is necessary for the heaters to be heated to a sufficiently high temperature and for water to be pumped through them at a slow enough rate that steam is generated which must then be allowed to travel into the respective chamber. The present Applicant has appreciated that this can lead to a significant delay in steam being provided after it has been called for in a particular heating program. It can also run the risk of the amount of steam actually being delivered to the chamber being less than was intended if the associated valve is closed prematurely.

SUMMARY OF THE DISCLOSURE

The present invention aims to address the problems set out above and when viewed from a first aspect provides a device for heating food items comprising a plurality of chambers for receiving respective food items, a steam generator and a plurality of valves for controlling admittance of steam from said steam generator into said chambers, said device being arranged to operate in at least one mode in which during a first period a first one of said valves is open and at least one of said valves remains closed and wherein said steam generator is operated to produce steam for a time less than said first period.

Thus it will be seen by those skilled in the art that in accordance with the invention a common steam generator is provided which serves a number of chambers, preferably all chambers. This reduces cost and allows a more powerful, more efficient steam generator to be used. It will further be appreciated that in accordance with the invention individual valves may be opened when their associated chambers require steam. The time for which steam is provided to the chamber(s) is not always controlled by the respective valve but rather by operation of the steam generator depending on how many chambers need to be heated during the cooking process. This is advantageous as it mitigates the effect of latency in the delivery of steam and can ensure that all of the steam produced in a burst is delivered to the respective chamber(s).

During said mode the steam generator may provide steam only to the chamber or chambers controlled by said valve. The valve may therefore remain open continuously or for a majority of the time. By operating the steam generator periodically a desired level of heating in said chamber(s) associated with the valve can be achieved. Alternatively, during a second period said first valve is closed and a second valve is opened and said steam generator is operated to produce steam for a time less than said second period. This allows steam to be Provided periodically to a second chamber or set of chambers controlled by said second valve, thereby allowing it/them to be heated to a desired level. This may be repeated for a third or fourth period but in a set of embodiments at least one of the plurality of valves remains closed during said mode.

The device may comprise an individual valve for each chamber. In a set of embodiments however one or more composite valves serving more than one chamber may be provided. Such a composite valve may be arranged to supply steam to plural associated chambers simultaneously or only one at a time.

The steam generator may take any suitable form. In a set of embodiments it comprises a heated cavity comprising a sheathed resistance heating element mounted to or formed integrally with a wall thereof. In a set of embodiments a water supply arrangement is provided to supply water to the steam generator. The water supply arrangement may comprise a pump. The water supply arrangement may in a set of embodiments also be arranged to supply water to one or more of the chambers

BRIEF DESCRIPTION OF THE DRAWINGS

An embodiment of the invention will now be described, by way of example only, with reference to the accompanying drawings in which.

DETAILED DESCRIPTION OF THE INVENTION

Figure 1:
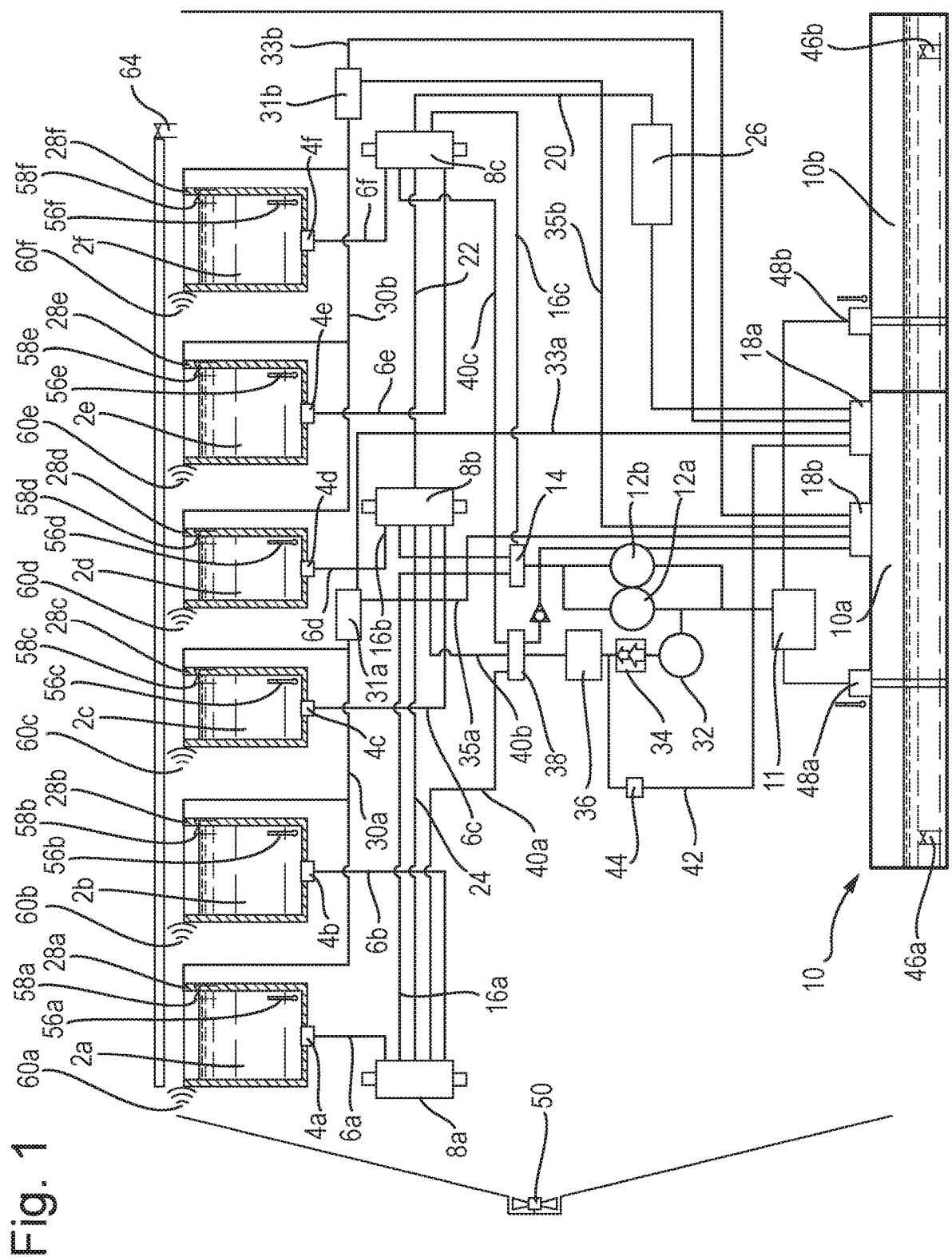
FIG. 1 is a schematic diagram of a device for heating food items in accordance with the invention.

FIG. 1 is a schematic diagram of a food re-heating appliance which comprises six individual chambers 2a,b,c, d,e,f which in use receive sealed packages of raw, cooked or partially cooked food. The device described hereinbelow acts to cook, reheat or complete cooking of the food inside the packages using a combination of hot water and steam according to a predetermined program specified by the chef responsible for the particular dish. The plurality of chambers mean that, if necessary, different programs can be applied to some or all of the chambers to suit their contents. An entire meal comprising a number of different components can therefore be prepared to be ready at a common time.

Each chamber 2a-f comprises a multi-purpose inlet/outlet port 4a-f which can allow water and/or steam into the respective chamber and which can also allow water to be drained out again. Although not visible in FIG. 1, each inlet/outlet port 4a-f comprises a mesh filter, e.g. a non-woven mesh filter which acts to reduce the noise generated when steam is admitted into the corresponding chamber. The meshes also traps any food particles or other contamination which may have made its way into the chambers 2a-f.

Pairs of the inlet/outlet ports 4a-f are connected by means of conduits 6a-f to a respective one of three composite valve pairs 8a,b,c. Thus the two leftmost chambers 2a, 2b are connected to the first valve pair 8a, the middle chambers 2c, 2d are connected to the second valve pair 8b and the rightmost two chambers 2e, 2f are connected to the third valve pair 8c.

A dual chamber water tank 10 is provided at the bottom of the apparatus. It has a hot chamber 10a and a cold chamber 10b and supplies water to the rest of the apparatus as required. A selector switch 11 allows water to be drawn from the hot or cold chambers 10a, 10b respectively. Two parallel pumps 12a, 12b are provided to pump water to a water manifold 14. Having two pumps allows additional flow rate to be achieved when providing water to more than three chambers Respective conduits 16a, 16b, 16c supply water to the valve pairs 8a, 8b, 8c. This means that water can be supplied from the tank 10 to any of the chambers 2a-f when the corresponding valves of the valve pairs 8a, 8b, 8c are opened.

The three composite valves 8a-c are also connected to a water return manifold 18a feeding the hot chamber 10a of the water tank by means of a drain conduit 20. The third valve pair 8c is connected to the drain conduit 20 directly. The second valve pair 8b is connected via a pass-through arrangement and a further conduit 22 while the first valve 8a is connected via a further conduit 24. This arrangement allows water to be drained from the respective chambers 2a-f to the tank hot chamber 10a. A drain valve 26 which also acts as a pressure relief valve for the water tank hot chamber 10a is provided in the drain conduit 20.

As well as being able to be drained in normal use through their respective inlet/outlet port 4a-f, each of the chambers 2a-f has an overflow outlet 28a-f connected to one of two common overflow conduits 30a, 30b that connect to respective collectors 31a, 31b. The collectors 31a, 31b act to separate water and steam and then pass the water through water return conduits 33a, 33b into the drain manifold 18a and pass steam through steam return conduits 35a, 35b to the other drain manifold 18b.

A further pump 32 is arranged to pump water on demand via a constant flow rate valve 34 to a steam generator boiler 36. This boiler 36 may be as described in WO 2012/049517. The steam generator 36 supplies steam to a common filter/manifold 38 which in turn supplies the steam to the three composite valve pairs 8a-c by means of respective steam conduits 40a, 40b, 40c. A pressure relief path 42 is provided from between the constant flow valve 34 and the steam generator 36 to the water drain manifold 18a via a pressure relief valve 44.

Each chamber of the water tank 10 is provided with a respective level sensor 46a, 46b and a temperature sensor (not shown) incorporated in a corresponding intake valve 48a, 48b.

A cooling fan 50 blows air over the appliance.

Returning to the chambers 2a-f, each of them further comprises a temperature sensor 56a-f, a water level sensor 58a-f and a Radio Frequency IDentification (RFD) interrogator 60a-f. This is able to read RFID labels on food packages placed into the corresponding chamber. A lid (not shown) covering all of the chambers 2a-f is provided together with a microswitch 64 for sensing when the lid is securely closed.

Although not shown, the sensors, valves and pumps are all connected to a microcontroller which controls their operation.

In use packages of pre-prepared food are placed into some or all of the chambers 2a-2f and the lid 62 is securely closed. The respective RFID interrogators 60a-f receive data from corresponding RFID labels on the packages which identify the contents of the packages and the heating program which should be applied to them. The heating program may be contained within the data or retrieved based on the contents of the pack from the device's memory or from a remote location, e.g. over the Internet.

The food may be heated via steam or via water which is heated by passing steam through it. The water and/or steam is applied to each chamber in turn in a cycle such that only one of the chamber-specific valves (two of which form the composite valve pairs 8a-8c) is open at any given time. This advantageously allows steam and/or water to be supplied to the selected chamber in a controlled manner without the risk of unequal sharing—e.g. as a result of imperfect flow resistance balance. It also reduces the risk of 'cross-talk' between chambers (e.g. where one chamber is at a different temperature to another). Steam and/or water may be applied in a number of cycles. As will now be described, in accordance with the invention the way in which the steam is applied to specific chambers when it is not required in all chambers is tailored to ensure maximum control over the amount of steam delivered.

Figure 2:
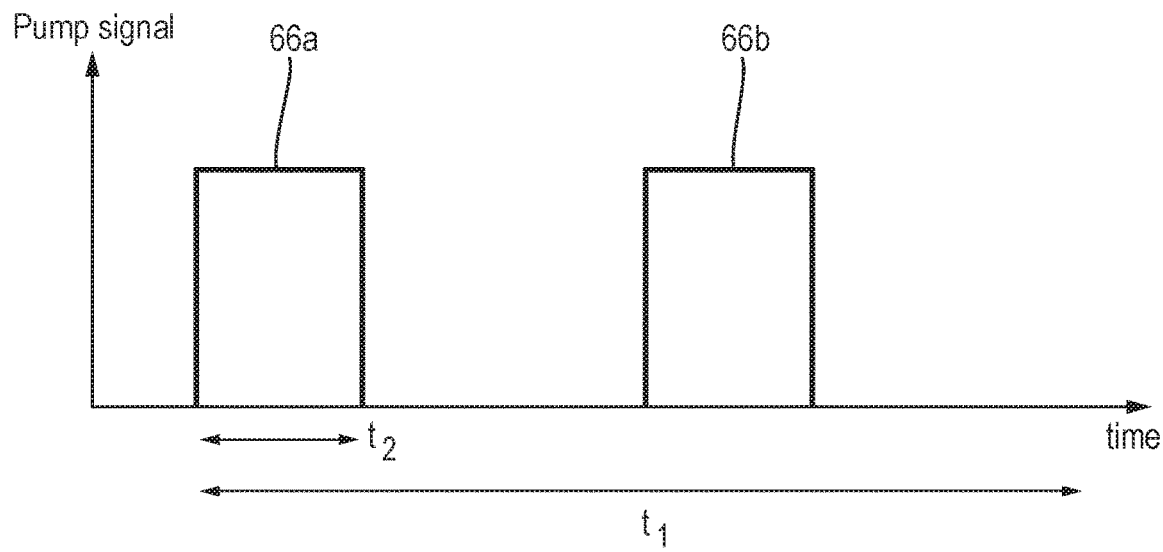
FIG. 2 is a graph showing a representative control signal to a pump which feeds the steam generator pump.

With reference first to FIG. 2 there may be seen a plot showing a representative drive signal applied to the pump 32 for providing steam to just two of the chambers. This shows a cycle length $t_1$ during which there are two 'on' periods 66a, 66b of time $t_2$ intended to generate steam to be applied to the two respective chambers 2a, 2b.

The pump 32 is operated for a period of time $t_1$ to supply water to the steam generator 36 to be delivered to the relevant chamber 2a, 2b via the manifold 38, composite valve 8A and associated conduits.

Figure 3:
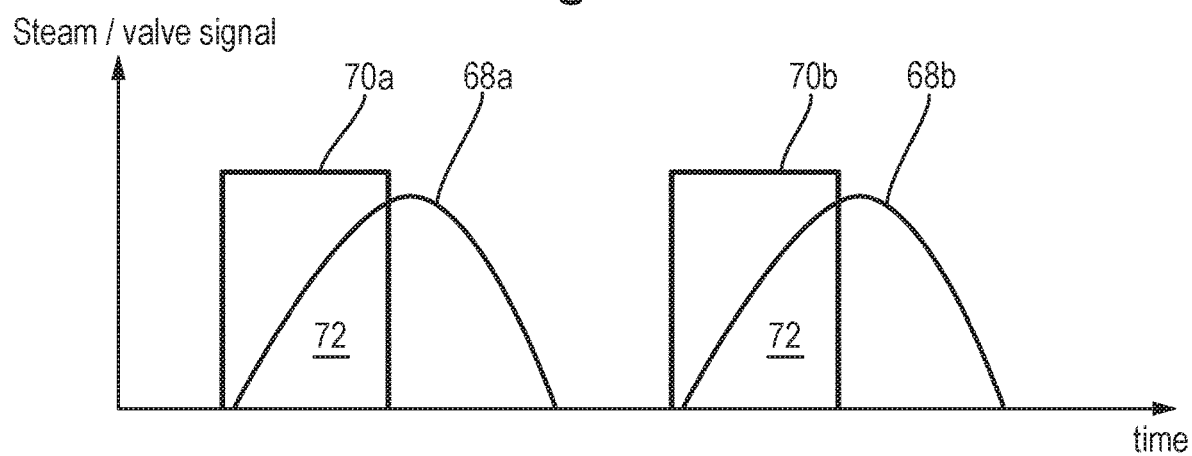
FIG. 3 is a graph showing the amount and phasing of steam produced and the control signal to a valve controlling entry of steam into chambers in a reference arrangement not in accordance with the invention.

As may be seen in FIG. 3 however, the response as measured by the steam flow rate 68a reaching the respective chambers 2a, 2b lags the pump drive signal 66a, 66b. This of course arises from the time taken for the water to be moved from the tank 10 to the boiler 36, for the water then to boil and for the steam to pass through the various valves and conduits to the chamber 2a, 2b. Theoretically this problem could be reduced by using an 'always on' steam generator which maintained sufficient steam pressure to be delivered simply by opening a valve, but such an arrangement would result in significantly greater energy use and excess steam, particularly where not all of the chambers are set to receive steam in a given part of the program.

It will be appreciated that because of this if the signal 70a, 70b causing the valve 8A to open a pathway to allow steam to enter the respective chambers 2a, 2b were to coincide exactly with the pump signal 66a, 66b, in fact only a proportion of the generated steam (indicated by the area 72) would reach the chamber.

Figure 4:
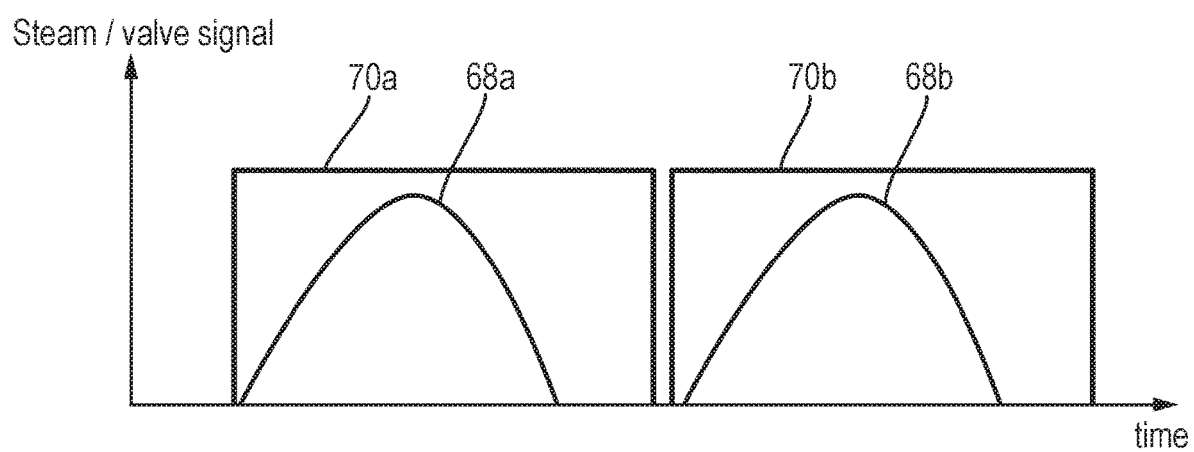
FIG. 4 is a graph corresponding to FIG. 2 showing the amount and phasing of steam produced and the control signal to the valve controlling entry of steam into chambers in an arrangement embodying the invention.

FIG. 4 illustrates the improvement which can be achieved in accordance with an embodiment of the invention. In this case the same pump control signal 66a, 66b is applied as is shown in FIG. 2 giving rise to the same steam response 68a, 68b. However in this case the valve control signal 70a, 70b is used to open the respective part of the valve 8A for the whole of the cycle timeslot allocated to that chamber 2a, 2b. As will be seen this means that substantially all of the steam generated in the boiler 36 reaches the chamber 2a, 2b. This facilitates more careful control of the how much heat energy is applied and also maximizes efficiency.

Figure 5:
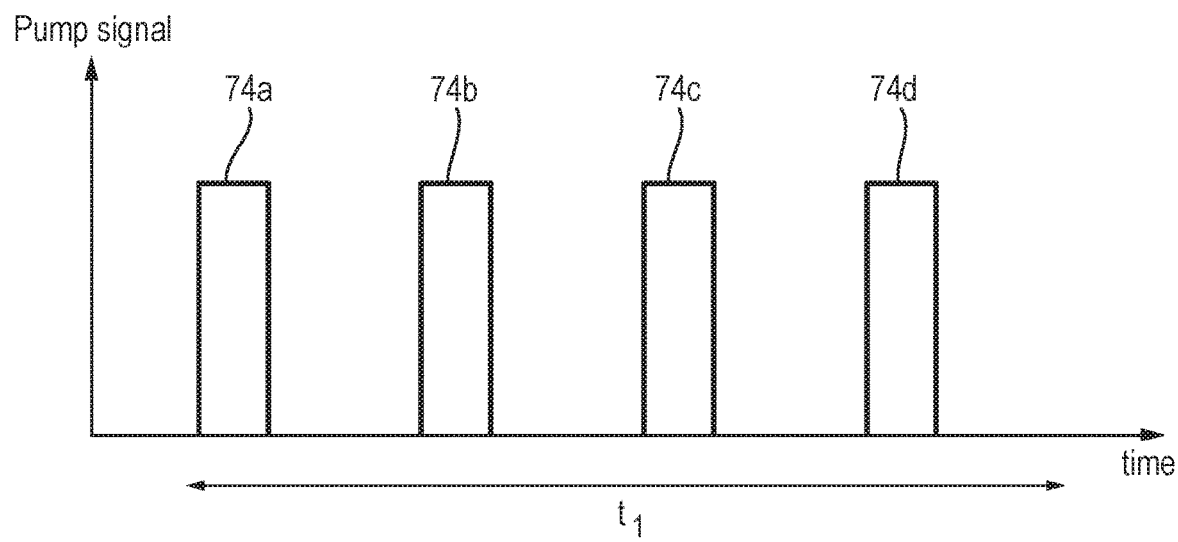
FIG. 5 is a graph showing a representative control signal to a pump feeding a steam generator when steam is provided to four chambers instead of two.
Figure 6:
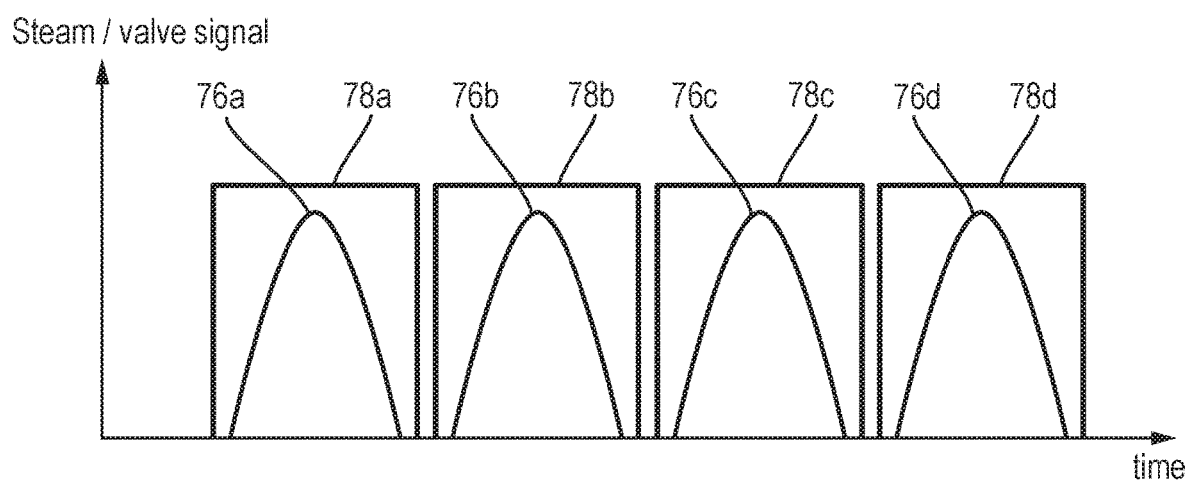
FIG. 6. is a graph corresponding to FIG. 5 showing the amount and phasing of steam produced and the control signal to the valves.

FIGS. 5 and 6 show a further possible mode of operation. Here four chambers 2a, 2b, 2c, 2d of the six are supplied with steam rather than two. The cycle length $t^1$ is the same as the previous embodiment and therefore each pump control signal 74a-d is half the length, as are the corresponding steam responses 76a-d and valve opening times 78a-d. As previously, however, the valve to each respective chamber 2a-d is open throughout substantially all of the portion of the cycle associated with that chamber, significantly longer than the corresponding pump drive signal 66a-d so that substantially all of the corresponding steam response 68a-d is transmitted to the chamber 2a-d.

Figure 7:
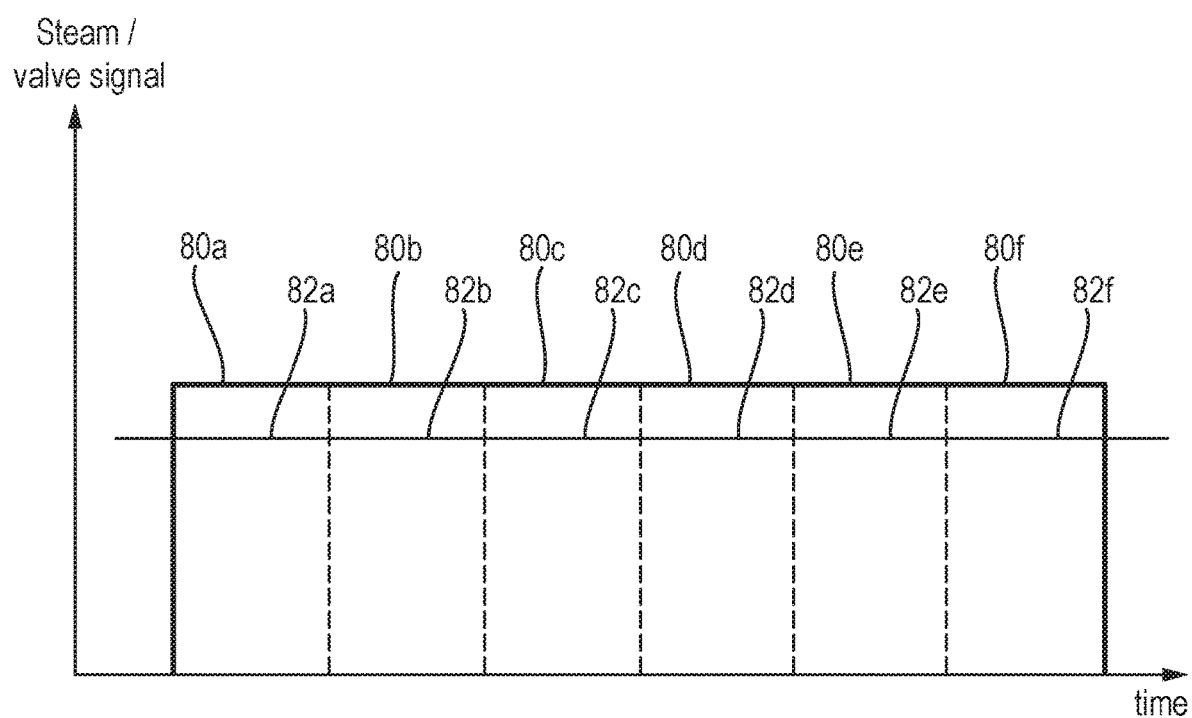
FIG. 7 is a graph showing a representative control signal to a pump feeding a steam generator when steam is provided to all six chambers.

FIG. 7 shows, for comparison, the corresponding situation when steam is required to all six chambers 2a-2f. Here the pump control signal (not shown) is continuous so that steam is produced continuously. The corresponding valve control signals 80a-80f are contiguous so that the steam is directed in turn to all six chambers 2a-2f. Since the pump is not powered down, there is no ramp up and ramp down phase so the respective steam responses 82a-82f are also effectively flat.

What is claimed is:

1. A food heating device comprising:
   a plurality of chambers capable of receiving respective food items;
   a steam generator; and
   a plurality of valves for controlling admittance of steam from said steam generator into one or more of said plurality of chambers, the plurality of valves including a first valve and a second valve,
   a microcontroller configured to control the plurality of valves and the steam generator to operate in at least a first mode in which the first valve is open for a first period to permit said admittance of steam from said steam generator into said one or more of said plurality of chambers, the first period commencing upon an opening of said first valve and ending upon a closing of said first valve, and during said first period the second valve is closed, and wherein said steam generator is operated to produce steam for a time less than said first period.

2. The device of claim 1 wherein the steam generator serves all of said plurality of chambers present in the device.

3. The device as claimed in claim 1 wherein said at least one mode comprises a second period during which said first valve is closed and a second valve is open and wherein said steam generator is operated to produce steam for a time less than said second period.

4. The device as claimed in claim 1 wherein the at least one of said plurality of valves remains closed during said at least one mode.

5. The device of claim 1 comprising one or more composite valves serving more than one of said plurality of chambers.

6. The device of claim 1 comprising a water supply arrangement to supply water to the steam generator.

7. The device of claim 6 wherein the water supply arrangement comprises a pump.

8. The device of claim 6 wherein the water supply arrangement is arranged to supply water to one or more of said plurality of chambers.

9. The device of claim 1, wherein said steam generator is operated to stop producing steam prior to said subsequent closing of said first valve.

10. The device of claim 1, wherein only one valve of said plurality of valves is open at a time.

* * * * *